(12) United States Patent
Meisels et al.

(10) Patent No.: US 7,743,056 B2
(45) Date of Patent: Jun. 22, 2010

(54) IDENTIFYING A RESULT RESPONSIVE TO A CURRENT LOCATION OF A CLIENT DEVICE

(75) Inventors: Adrienne C. Meisels, New York, NY (US); Stephen J. Coughlin, Falls Church, VA (US); George Fletcher, Round Hill, VA (US); David S. Bill, San Francisco, CA (US)

(73) Assignee: AOL Inc., Dulles, VA (US)

(*) Notice: Subject to any disclaimer, the term of this patent is extended or adjusted under 35 U.S.C. 154(b) by 30 days.

(21) Appl. No.: 11/618,348

(22) Filed: Dec. 29, 2006

(65) Prior Publication Data

US 2008/0249983 A1    Oct. 9, 2008

Related U.S. Application Data

(60) Provisional application No. 60/787,690, filed on Mar. 31, 2006, provisional application No. 60/747,746, filed on May 19, 2006, provisional application No. 60/789,910, filed on Apr. 7, 2006.

(51) Int. Cl.
G06F 7/00 (2006.01)
G06F 17/30 (2006.01)

(52) U.S. Cl. .................. 707/731; 707/771
(58) Field of Classification Search .......... 701/207, 701/208, 209
See application file for complete search history.

(56) References Cited

U.S. PATENT DOCUMENTS

| 4,301,506 A | 11/1981 | Turco |
|---|---|---|
| 4,393,448 A | 7/1983 | Dunn et al. |
| 4,413,322 A | 11/1983 | Foster et al. |
| 4,528,552 A | 7/1985 | Moriyama et al. |
| 4,546,439 A | 10/1985 | Esparza |
| 4,570,227 A | 2/1986 | Tachi et al. |
| 4,646,089 A | 2/1987 | Takanabe et al. |
| 4,689,747 A | 8/1987 | Kurose et al. |
| 4,796,189 A | 1/1989 | Nakayama et al. |
| 4,827,419 A | 5/1989 | Selby, III |
| 4,866,626 A | 9/1989 | Egli |
| 4,876,651 A | 10/1989 | Dawson et al. |
| 4,890,104 A | 12/1989 | Takanabe et al. |
| 4,914,605 A | 4/1990 | Loughmiller, Jr. |
| 4,926,336 A | 5/1990 | Yamada |
| 4,937,753 A | 6/1990 | Yamada |

(Continued)

OTHER PUBLICATIONS

Snyder, John P., "Map Projections—A Working Manual"; U.S. Geological Survey Professional Paper; 1987; U.S. Department of Interior, 383 pages.

(Continued)

Primary Examiner—Cam Y T Truong
(74) Attorney, Agent, or Firm—Fish & Richardson P.C.

(57) ABSTRACT

A method for identifying a result responsive to a current location of a client device includes receiving, form a client device and at a host, a search query that includes a point of interest and a current location of the client device. The method also includes automatically updating the search query as the current location of the client device changes and instructing the host to identify a potential location associated with the point of interest and located within a user-defined proximity from the current location of the client device.

38 Claims, 4 Drawing Sheets

U.S. PATENT DOCUMENTS

| | | |
|---|---|---|
| 4,954,958 A | 9/1990 | Savage et al. |
| 4,962,458 A | 10/1990 | Verstraete |
| 4,984,168 A | 1/1991 | Neukrichner et al. |
| 5,031,104 A | 7/1991 | Ikeda et al. |
| 5,041,983 A | 8/1991 | Nakahara et al. |
| 5,067,081 A | 11/1991 | Person |
| 5,115,399 A | 5/1992 | Nimura et al. |
| 5,121,326 A | 6/1992 | Moroto et al. |
| 5,168,452 A | 12/1992 | Yamada et al. |
| 5,170,353 A | 12/1992 | Verstraete |
| 5,172,321 A | 12/1992 | Ghaem et al. |
| 5,189,430 A | 2/1993 | Yano et al. |
| 5,191,406 A | 3/1993 | Brandestini et al. |
| 5,191,532 A | 3/1993 | Moroto et al. |
| 5,231,584 A | 7/1993 | Nimura et al. |
| 5,270,937 A | 12/1993 | Link et al. |
| 5,272,638 A | 12/1993 | Martin et al. |
| 5,274,387 A | 12/1993 | Kakihara et al. |
| 5,293,163 A | 3/1994 | Kakihara et al. |
| 5,353,034 A | 10/1994 | Sato et al. |
| 5,442,557 A | 8/1995 | Kaneko |
| 5,486,822 A | 1/1996 | Tenmoku et al. |
| 5,557,524 A | 9/1996 | Maki |
| 5,608,635 A | 3/1997 | Tamai |
| 5,790,974 A | 8/1998 | Tognazzini |
| 6,282,489 B1 | 8/2001 | Bellesfield et al. |
| 6,401,034 B1 * | 6/2002 | Kaplan et al. ............... 701/209 |
| 6,498,982 B2 | 12/2002 | Bellesfield et al. |
| 6,609,064 B1 | 8/2003 | Dean |
| 6,678,613 B2 | 1/2004 | Andrews et al. |
| 6,741,188 B1 | 5/2004 | Miller et al. |
| 6,801,139 B2 | 10/2004 | Tretyak, Jr. |
| 6,842,696 B2 | 1/2005 | Silvester |
| 6,895,329 B1 * | 5/2005 | Wolfson ..................... 701/209 |
| 6,944,539 B2 | 9/2005 | Yamada et al. |
| 7,085,649 B2 | 8/2006 | Baur et al. |
| 7,373,244 B2 | 5/2008 | Kreft |
| 2002/0019835 A1 | 2/2002 | Baur et al. |
| 2002/0188603 A1 * | 12/2002 | Baird et al. .................... 707/3 |
| 2003/0001779 A1 | 1/2003 | Mintz et al. |
| 2003/0036848 A1 * | 2/2003 | Sheha et al. ................. 701/209 |
| 2003/0191578 A1 * | 10/2003 | Paulauskas et al. ......... 701/200 |
| 2004/0260465 A1 * | 12/2004 | Tu ............................. 701/209 |
| 2005/0096841 A1 | 5/2005 | Gedik et al. |
| 2005/0096946 A1 | 5/2005 | Janakiraman et al. |
| 2005/0227712 A1 | 10/2005 | Estevez et al. |
| 2006/0058952 A1 | 3/2006 | Cooper et al. |
| 2006/0218029 A1 | 9/2006 | Chin |

OTHER PUBLICATIONS

Sherman, Chris, "Search Engine Watch: Google Launches Local for Mobile," reprinted on Sep. 11, 2006 from http://searchenginewatch.com/showPage.html?page=sew_print&id=3561956.

Guzolek, J., and Koch, E., "Real-time Route Planning in Road Networks," 1989 IEEE, pp. 165-169.

Pruitt, Scarlet, "MapQuest Goes Mobile," *PC World*, reprinted from http://www.pcworld.com/article/id,119161-page,1/article.html on Jul. 26, 2007, 3 pages.

"Yahoo! Mobile. The Internet Now Fits Your Phone," reprinted from heep://mobile.yahoo.com/;_ylt=AujFWTXXwBsSTR8Hk_P52L1bztAcJ on Jul. 26, 2007, 2 pages.

"Mobile Web Hop Online Anywhere on your Phone," reprinted from http://mobile.yahoo.com/mobileweb;_ylt=AvZP2FpcYsq1R9iZxOpUIUnntAcJ on Jul. 26, 2007, 3 pages.

"Yahoo! GO 2.0 Improved! The Internet to Go," reprinted from http://mobile.yahoo.com/go;_ylt=AqcFZ_48Qo6sCBg9mCOe6YktQcJ, on Jul. 26, 2007, 6 pages.

"MapQuest Help: What is Turn-by-Turn Navigation?," reprinted from http://help.mapquest.com/jive/entry.jspa?externalID=298&categoryIDS=35 on Jul. 26, 2007, 1 page.

Singh, Bhagat, and Naps, Thomas L., *Introduction to Data Structures*, "The Shortest Path Algorithm," West Publishing Company, 1985, pp. 215-223.

Notice of Allowance dated Aug. 10, 2005; U.S. Appl. No. 10/273,889; 4 pages.

Final Office Action dated Jan. 24, 2005; U.S. Appl. No. 10/273,889; 8 pages.

Non-Final Office Action dated Sep. 10, 2003; U.S. Appl. No. 10/273,889; 6 pages.

Non-Final Office Action dated Apr. 16, 2004; U.S. Appl. No. 10/273,889; 7 pages.

Non-Final Office Action dated Dec. 19, 2006; U.S. Appl. No. 11/328,455; 9 pages.

Final Office Action dated Jun. 26, 2007; U.S. Appl. No. 11/328,455; 7 pages.

International Search Report and Written Opinion for International Application No. PCT/US07/89039, dated Apr. 23, 2008, 16 pages.

International Search Report and Written Opinion for International Application No. PCT/US07/65714, dated Jun. 20, 2008, 17 pages.

Office Action for U.S. Appl. No. 11/618,069, mailed Dec. 31, 2008.

Office Action for U.S. Appl. No. 11/648,069, mailed Jan. 5, 2010.

* cited by examiner

IDENTIFYING A RESULT RESPONSIVE TO A CURRENT LOCATION OF A CLIENT DEVICE

CROSS REFERENCE TO RELATED APPLICATIONS

The present application claims priority from U.S. Provisional Application No. 60/789,910, filed Apr. 7, 2006, U.S. Provisional Application No. 60/787,690, filed Mar. 31, 2006, and U.S. Provisional Application No. 60/747,746, filed May 19, 2006. The contents of the prior applications are incorporated herein by reference in their entirety.

TECHNICAL FIELD

This document relates to identifying a result responsive to a current location of a client device.

BACKGROUND

A common use of the Internet involves accessing at leverage search engines to retrieve information responsive to user-designated query terms. For example, a user may access a search engine and request information related to a particular service of interest, such as a movie theater.

SUMMARY

In one general aspect a method for identifying a result responsive to a current location of a client device includes receiving, from a client device and at a host, a search query that includes a point of interest and a location corresponding to a current location of the client device, accessing user-defined information that relates to a travel distance or travel time, and determining the travel distance or the travel time based on the accessed user-defined information. The method also includes referencing a travel objective. The travel objective includes instructions for processing the location corresponding to the current location of the client device received with the search query, the travel distance or the travel time determined based on the accessed user-defined information, and the point of interest received with the search query to identify at least one potential location based on a relationship between the potential location and the point of interest and based on a determination that the potential location and the location of the client device received with the search query are located within the travel distance or accessible within the travel time determined based on the accessed user-defined information. The method also includes identifying a search result by applying the travel objective to the location corresponding to the current location of the client device.

The method further includes automatically receiving, from the client device, a new location of the client device as the location of the client device changes, comparing the new location to the location received with the search query to determine whether the new location of the client device differs by more than a threshold amount from the location received with the search query, and determining whether the new location of the client device differs by more than the threshold amount from the location received with the search query. If it is determined the new location of the client device differs by more than the threshold amount from the location received with the search query, the method includes updating the search result to include at least one potential location located within the travel distance or accessible within the travel time from the new location of the client device.

Implementations of the above general aspect may include one or more of the following features. For example, the location corresponding to the current location of the client device may include an actual position of the client device. Alternatively or additionally, the location corresponding to the current location of the client device may include a location that is used as a surrogate for the current location of the client device. The location used as the surrogate may include a location of a base station or an access point that the client device uses for communication. The location of the base station or the access point may indicate a proximate current location of the client device. The base station may include a cellular base station and the client device may include a mobile phone.

Automatically receiving the new location of the client device may include automatically receiving, from the client device, the new location as a part of an updated search query as the location of the client device changes. Alternatively or additionally, automatically receiving the new location of the client device may include periodically receiving, from the client device, location information associated with the client device irrespective of whether the current location of the client device has changed. Alternatively or additionally, automatically receiving the new location may include receiving, from the client device and without an input from a user of the client device, the new location of the client device if it is determined that the new location is different from the previous location of the client device received with the search query. The new location may be determined via a location-based system. The location-based system may include a global positioning system.

Updating the search result may include referencing the travel objective that includes instructions for processing the new location of the client device, the travel distance or the travel time determined based on the accessed user-defined information, and the point of interest received with the search query to identify at least one potential location based on a relationship between the potential location and the point of interest and based on a determination that the potential location and the new location of the client device are located within the travel distance or accessible within the travel time determined based on the accessed user-defined information and updating the search result by applying the travel objective to the new location of the client device. The at least one potential location may be associated with the point of interest received with the search query, and the at least one potential location may be located within the travel distance or accessible within the travel time, determined based on the accessed user-defined information, from the new location of the client device.

Updating the search result may include replacing the search result with a new search result including the at least one potential location that is associated with the point of interest and that is located within the travel distance or accessible within the travel time from the new location of the client device. Alternatively or additionally, updating the search result may include appending the search result with a new search result including the at least one potential location that is associated with the point of interest and that is located within the travel distance or accessible within the travel time from the new location of the client device. Alternatively or additionally, updating the search result may include deleting the search result that falls outside the determined travel distance or travel time from the new location of the client device.

The search query may include a user-entered keywords and detected location corresponding to the current location of the client device. Alternatively or additionally, the search query may include a user-entered keywords and a user entered location corresponding to the current location of the client device.

The point of interest may include an establishment associated with one or more locations. Alternatively or additionally, the point of interest may include a facility name. Alternatively or additionally, the point of interest may include an object in which a user of the client device is interested. The object may be associated with a particular activity.

Accessing the user-defined information may include accessing the user-defined information that relates to the travel distance and updating the search result may include updating the search result to include at least one potential location located within the travel distance from the new location of the client device if it is determined the new location of the client device differs by more than the threshold amount from the location received with the search query. Alternatively or additionally, accessing the user-defined information may include accessing the user-defined information that relates to the travel time and updating the search result may include updating the search result to include at least one potential location accessible within the travel time from the new location of the client device if it is determined the new location of the client device differs by more than the threshold amount from the location received with the search query. The method also may include receiving an indication of time at which the search result should be identified.

In another general aspect, a method for identifying a result responsive to a future location of a client device includes receiving, from a client device and at a host, a search query that includes a point of interest and a location corresponding to a current location of the client device, accessing user-defined information that relates to a travel distance or travel time, and determining the travel distance or the travel time based on the accessed user-defined information. The method also includes determining speed and direction of the travel of the client device, and predicting a first future location of the client device based on the speed, direction of travel, and the current location of the client device. The method further includes referencing a travel objective.

The travel objective includes instructions for processing the first future location of the client, the travel distance or the travel time determined based on the accessed user-defined information, and the point of interest received with the search query to identify at least one potential location based on a relationship between the potential location and the point of interest and based on a determination that the potential location and the first future location of the client device are located within the travel distance or accessible within the travel time determined based on the accessed user-defined information. The method also includes identifying a search result by applying the travel objective to the first future location of the client device.

The method also includes automatically receiving, from the client device, a new location of the client device as the location of the client device changes, comparing the new location to the location received with the search query to determine whether the new location of the client device differs by more than a threshold amount from the location received with the search query, and determining whether the new location of the client device differs by more than the threshold amount from the location received with the search query. If it is determined that the new location of the client device differs by more than the threshold amount from the location received in the search query, the method includes determining speed and direction of the travel of the client device, predicting a second future location of the client device based on the speed, direction of travel, and the new location of the client device, and updating the search result to include at least one potential location located within the travel distance or accessible within the travel time from the second future location of the client device.

Implementations of the above general aspect may include one or more of the following features. For example, the location corresponding to the current location of the client device may include an actual position of the client device. Alternatively or additionally, the location corresponding to the current location of the client device may include a location that is used as a surrogate for the current location of the client device. The location used as the surrogate may include a location of a base station or an access point that the client device uses for communication. The location of the base station or the access point may indicate a proximate current location of the client device. The base station may include a cellular base station and the client device may include a mobile phone.

Automatically receiving the new location of the client device may include automatically receiving, from the client device, the new location as a part of an updated search query as the location of the client device changes. Alternatively or additionally, automatically receiving the new location of the client device may include periodically receiving, from the client device, location information associated with the client device irrespective of whether the current location of the client device has changed. Alternatively or additionally, automatically receiving the new location may include receiving, from the client device and without an input from a user of the client device, the new location of the client device if it is determined that the new location is different from the previous location of the client device received with the search query. The new location may be determined via a location-based system. The location-based system may include a global positioning system.

Updating the search result may include referencing the travel objective that includes instructions for processing the second future location of the client device, the travel distance or the travel time determined based on the accessed user-defined information, and the point of interest received with the search query to identify at least one potential location based on a relationship between the potential location and the point of interest and based on a determination that the potential location and the second future location of the client device are located within the travel distance or accessible within the travel time determined based on the accessed user-defined information and updating the search result by applying the travel objective to the new location of the client device. The at least one potential location may be associated with the point of interest received with the search query, and the at least one potential location may be located within the travel distance or may be accessible within the travel time, determined based on the accessed user-defined information, from the second future location of the client device.

In one implementation, updating the search result may include replacing the search result with a new search result including the at least one potential location that is associated with the point of interest and that is located within the travel distance or is accessible within the travel time from the second future location of the client device. Alternatively or additionally, updating the search result may include appending the search result with a new search result including the at least one potential location that is associated with the point of interest and that is located within the travel distance or is accessible within the travel time from the second future location of the client device. Alternatively or additionally, updating the search result may include deleting the search result that falls outside the determined travel distance or travel time from the second future location of the client device.

The search query may include a user-entered keywords and detected location corresponding to the current location of the client device. Alternatively or additionally, the search query may include a user-entered keywords and a user entered location corresponding to the current location of the client device.

The point of interest may include an establishment associated with one or more locations. Alternatively or additionally, the point of interest may include a facility name. Alternatively or additionally, the point of interest may include an object in which a user of the client device is interested. The object may be associated with a particular activity.

Accessing the user-defined information may include accessing the user-defined information that relates to the travel distance and updating the search result may include updating the search result to include at least one potential location located within the travel distance from the new location of the client device. Alternatively or additionally, accessing the user-defined information may include accessing the user-defined information that relates to the travel time and updating the search result may include updating the search result to include at least one potential location accessible within the travel time from the new location of the client device.

The method also may include receiving an indication of time at which the search result should be identified.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

Figure 1:
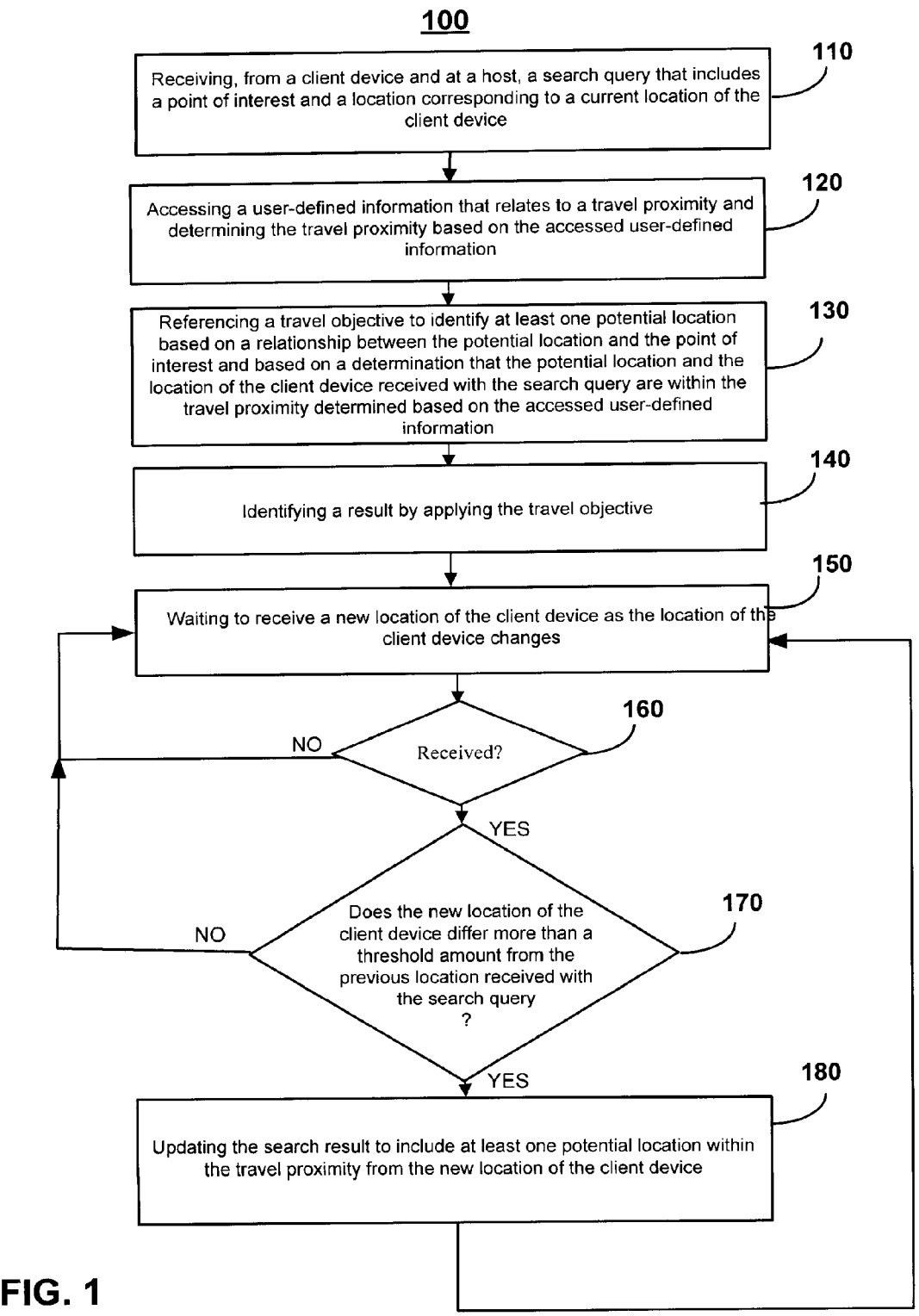
FIG. 1 illustrates an exemplary process used by a hosted service to identify a result within a user-defined proximity from a current location of a client device operated by the user.

In one implementation, a system is configured to provide a user with access to a geographically constrained search result. A user of a client device submits to a host a search query that includes a current location of the client device and a point of interest. The point of interest may be associated with an establishment having one or more locations associated therewith. In response, the host provides a result that includes a potential location for the point of interest and is within a defined proximity from the current location of the client device. Thereafter, as the client device moves, the current location is detected and compared to the location submitted as part of the previous search query. If more than a threshold difference exists between the current location of the client device and the previously submitted location, the search query is resubmitted with an updated current location. The host receives the search query and identifies the current location has changed, and, in response, the host identifies a new search result that is within the defined proximity from the current location of the client device. In this manner, the host identifies a geographically constraint search result. As such, the user of the client device may be presented with proximate results to the current location irrespective of whether the client device is stationary or is moving.

In one example, the user may be operating a vehicle while searching for information. For example, the user may be searching for an apartment or a house. The user may submit a search query and a travel objective to a host. The search query may include one or more criteria associated with the apartment or the house. The one or more criteria may include, for example, a price range and/or a number of bedrooms. The search query also may include location data associated with a current location of the client device. The location data submitted as part of the search query may be updated to reflect the current location of the client device if the current location changes.

The travel objective may include a user-defined objective to which the result should be responsive. The user-defined objective may include instructions for identifying a result that is located within a user-defined proximity of the current location of the client device. After receiving the search query and the travel objective, the host may search for and identify a result that is responsive to the search query and the travel objective. Thus, the host may identify one or more apartments or houses that are responsive to the search query and are within the user-defined proximity of the current location of the client device. As the search query may be automatically updated with a changing current location, the result identified by the host also may be updated. For example, as the user travels a result list may be updated to identify results based on a current location of the traveling user. The host may determine that a result location is no longer within the user-defined proximity, and the host may remove the result associated with the result location from a result list presented to the user.

An exemplary process 100 of FIG. 1 may be used by a hosted service to identify a result within a user-defined proximity of a current location of a client device operated by a user. Below, process 100 is described with a brief reference to other illustrative figures, each of which is later described separately.

Process 100 begins with a host receiving, from a client device, a search query that includes a point of interest and a location corresponding to a current location of the client device (110). The host may receive the search query via a user interface ("UI"), such as, for example, UI 200 shown in FIG. 2. The UI 200 may be displayed, for example, on an in-vehicle navigation system, a mobile device, such as a cellular phone or a personal digital assistant ("PDA"), or other devices, such as personal computer.

The search query includes the point of interest. The point of interest may be entered manually and defined by a user-entered keywords or terms. Alternatively or additionally, the point of interest may be defined via selection(s) of one or more options within a UI, such as for example, the UI 200. The point of interest may represent an establishment associated with one or more locations. Alternatively or additionally, the point of interest may include a facility name.

The search query also includes the current location of the client device. The client location of the client device, similar to the search query, may be either entered manually and defined by a user-entered keywords or defined via selection of one or more options within a UI, such as for example, the UI 200. The current location of the client device may include an actual position of the client device. Alternatively or additionally, the current location of the client device may include a location used as a surrogate for the current location of the client device. The location used as the surrogate may include a location of a base station or an access point that the client device use to communicate with others. And, the location of the base station or the access point indicates a proximate current location of the client device. In one specific example, the base station includes a cellular base station and the client device includes a mobile phone.

In response to receiving the search query, the host accesses user-defined information that relates to a travel proximity and determines the travel proximity based on the accessed user-defined information (120). The travel proximity may include a travel distance or travel time. In one implementation, the user-defined information may be part of is a travel objective. The travel objective may be included in the search query and may be submitted to the host as part of the search query. In particular and referring to UI 200, the search query includes the travel objective portions, allowing the user to define the travel objective. In a slightly different implementation, the travel objective may be a default objective stored in a memory at the host and may not be submitted as part of the search query unless the user wishes to update the default setting, in which case the user submits a new travel objective to the host. In yet another example, the user may submit the search query and the travel objective separately to the host.

The travel objective includes instructions for identifying a potential location associated with the point of interest included in the search query, such that the potential location is within the travel proximity of the current location of the client device. The host references the travel objective to identify at least one potential location based on a relationship between the potential location and point of interest and based on a determination that the potential location and the location of the client device received with the search query are within the travel proximity determined based on the accessed user-defined information (130). To this end, the travel objective instructs the host to process the location of the client device received with the search query, the travel proximity (e.g., the travel distance or travel time) determined based on the accessed user-defined information, and the point of interest included in the search query to identify the at least one potential location associated with the point of interest.

Figure 3:
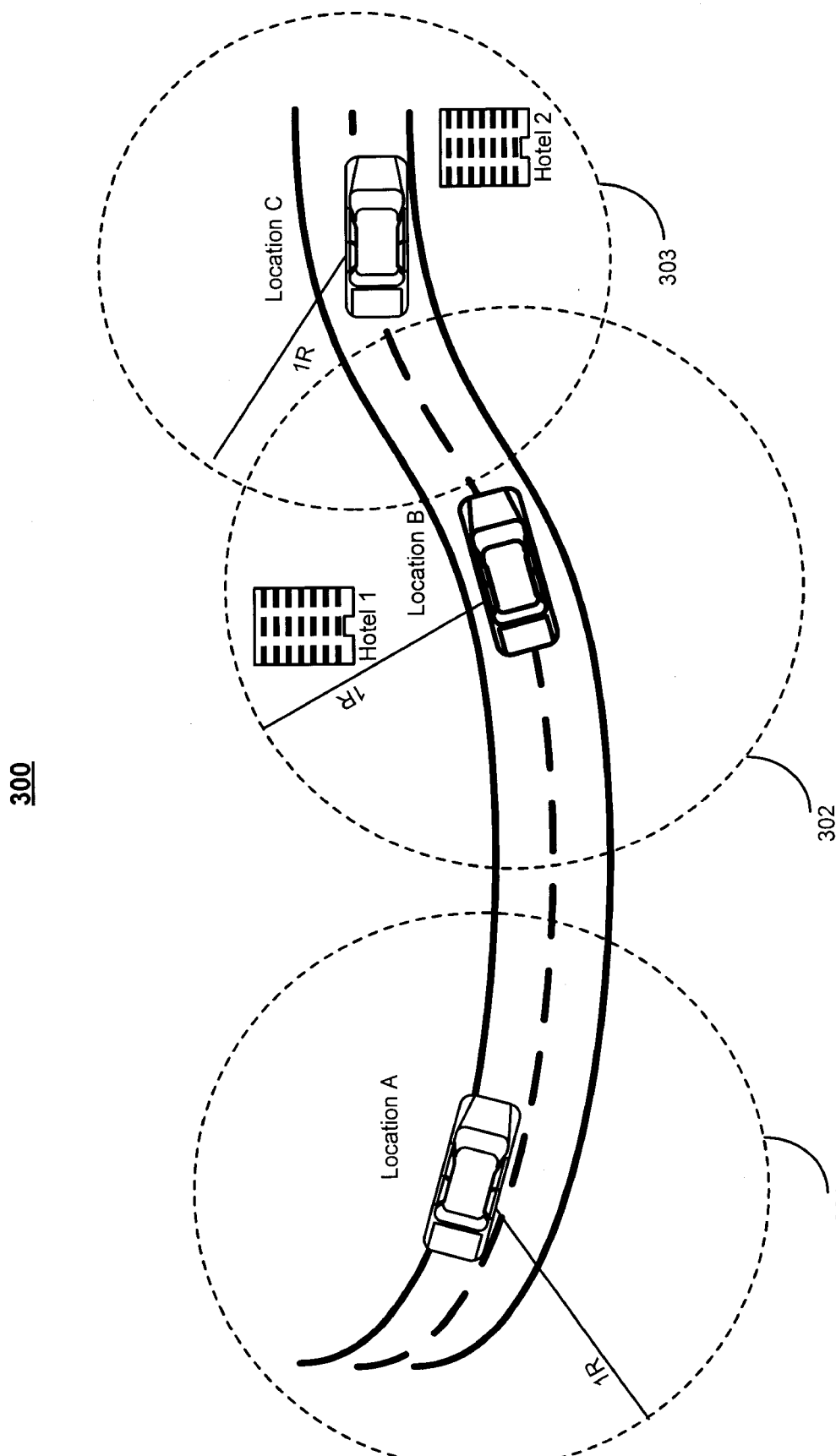
FIG. 3 illustrates a user of a client device operating a vehicle and searching for a hotel having a room for under $50 per night that is within 1 mile of a current location of the client device.

By applying the instructions, the host identifies the at least one potential location (140). To do so, in one implementation, the host identifies a boundary around the current location of the client device and searches within that boundary for a potential location associated with the point of interest. As shown in FIG. 3, the boundary may be a circular boundary, centered at the current location of the client device and having a radius approximately equal to the travel proximity.

After identifying a result or lack thereof, the host presents the results to the user and the host waits until it receives a new location of a client device as the location of the client device changes (150). In a decision block (160), the host checks to determine whether the new location has been received. If not (160, no), the host continues to wait for the new location of the client device and/or instructions from the client device to halt the process. Upon receiving the new location of the client device (160, yes), the host determines whether the new location of the client device differ by more than a threshold amount from the previous location received with the search query (170). If the new location of the client device differs from the previous location received with the search query more than the threshold amount (170, yes), the host updatres the search result to include at least one pottenial location for the point of interest included in the search query, such that the potential location is located within the travel proximity (e.g., the travel distance or travel time) from the new location of the client device (180).

To update the search result, the host again may reference the travel objective, which instructs the host to process the new location of the client device, the travel proximity determined based on the accessed user-defined information, and the point of interest included in the search query. By following the instructions, the host identifies the at least one potential location based on a relationship between the potential location and the point of interest and based on a determination that the potential location and the new location of the client device are within the travel proximity determined based on the accessed user-defined information.

In one implementation, as a part of updating the search query, the host replaces the previously identified search result with a new search result that includes the at least one location associated with the point of interest and located within the travel proximity from the new location of the client device. Alternatively, as a part of updating the search query, the host appends the previously identified search result with the new search result. Alternatively, as a part of updating the search result, the host only displays results that are within the travel proximity from the current location of the client device. As such, as the previously identified results move outside of the travel proximity (e.g., the travel distance or travel time) from the current location of the client device, the host deletes them from the search folder and/or the search list.

In a slightly modified scenario, process 100 may be modified, such that the client device performs the action (170) instead of the host. In particular, in this implementation, the client device automatically resubmits the search query when the new location differs by more than a threshold amount from the previously submitted location. In yet another example, the host may abstain from the threshold check and may proceed to perform action (180) regardless of whether the change in the client device's location is greater than the threshold amount. That is the host proceeds with the remaining action in process 100 as long as it is determined that the new location is different from the previously submitted location regardless of the amount of change in the location.

The host continues the actions performed in operational blocks (150, 160, 170, and 180) until a desired location for the point of interest is identified or the client device otherwise instructs the host to halt the process.

Figure 2:
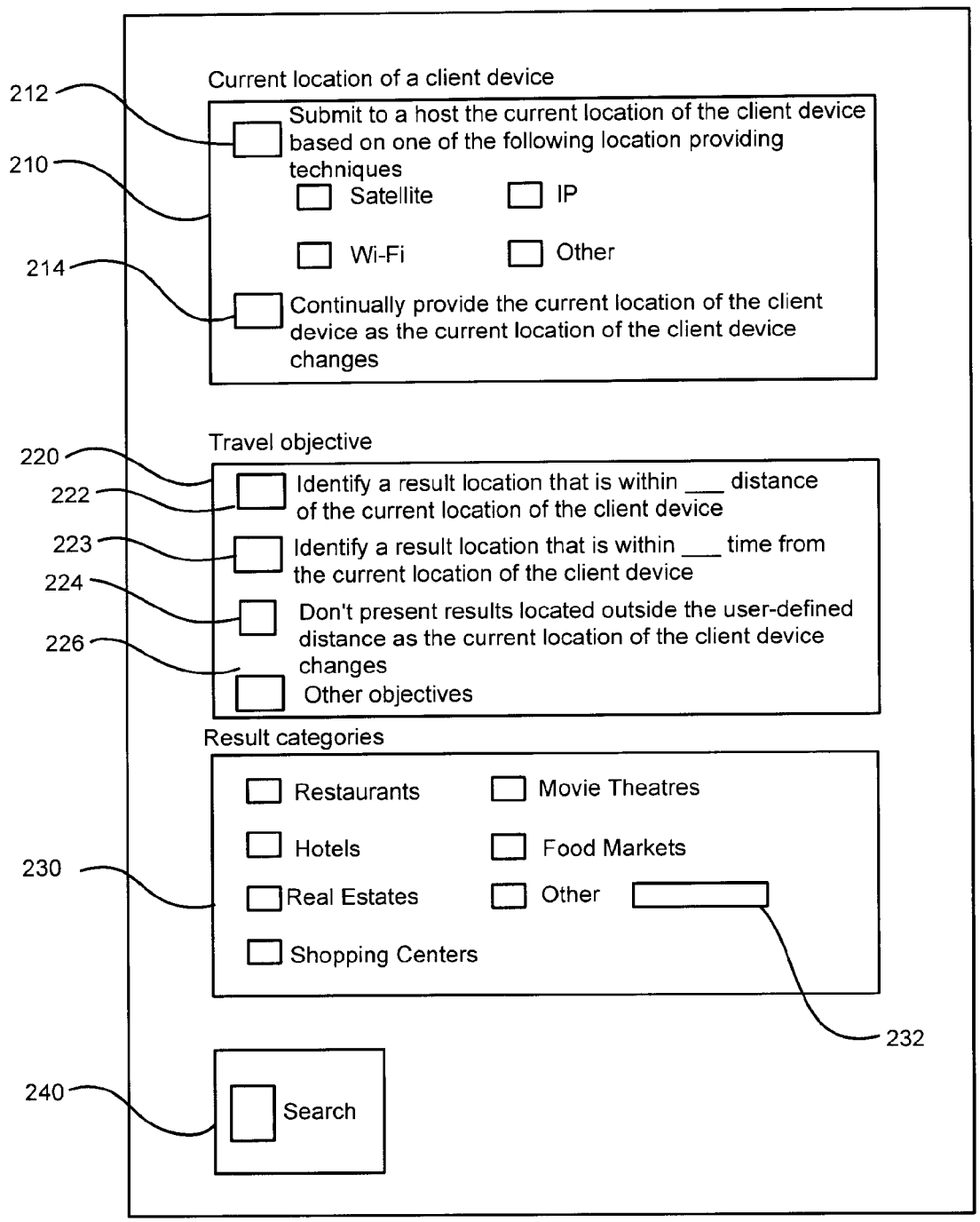
FIG. 2 illustrates an exemplary user interface that may be presented to a user of a client device searching for a particular service or location.

The exemplary UI 200 of FIG. 2 may be used to allow a user to continuously submit to a host a search query that includes location data associated with a current location of a client device. In particular, the user interface 200 includes a feature, allowing the client device to automatically update the search query as the current location of the client device changes. As the current location of the client device changes, the result identified by the host may be updated to be responsive to the current location. As shown, the user interface 200 includes a current location selection portion 210, a travel objective selection portion 220, a result selection portion 230, and a search selection portion 240. The current location selection portion 210 includes a current location option 212 and an update indicator 214. The current location option 212 allows the user to submit the current location of the client device.

In particular, to submit the current location, the user may select the current location option 212 and specify one or more location providing components to be used in providing the current location. The components may include a satellite system such as a global positioning system ("GPS"), a global Internet protocol ("IP") address, wireless network correlation techniques, and/or "other" techniques such as TV tower, cell tower, and/or radio frequency signal patterns of a client device. In one example, the current location of the client device, such as a mobile device, may be determined via a GPS module. The mobile device may provide the current location to the host if the user selects the current location option 212 and the satellite option as the location providing component.

Alternatively, the current location may be determined by registering the client device with a host (e.g., a Session Initiation Protocol ("SIP")) server. The client device may provide information to the host that is used to derive location information. For example, the host may derive location information based on how the client device is accessing the network (e.g., as identified by source IP address or another packet identifier). Alternatively, the current location of the client device may be determined using wireless network correlation techniques. For example, the current location may be determined via a base station or an access point that the client device is using to communicate with others. The location of the base station or the access point indicates the proximate current location of the client device.

The update indicator 214 enables the user to automatically provide the host with the current location of the client device as the current location changes. For example, the current location of the client device may be periodically submitted with a search query irrespective of whether the current location of the client device has changed. Alternatively, the current location of the client device may be updated when the current location actually changes. If the current location of the client device has changed, the search query may be updated to reflect the current location. In yet another example, the current location of the client device may only be submitted if it differs by more than a threshold amount from the previously submitted location. The threshold may be defined by the user and/or the host.

The user interface 200 also includes the travel objective selection portion 220. The travel objective selection portion 220 enables the user to identify a result that is within a travel proximity of the current location of the client device. In one example and as shown in FIG. 2, the travel proximity may include a user-defined distance. Alternatively, the travel proximity may include travel time. The travel objective selection portion 220 includes a distance portion 222, time portion 223, a remove portion 224, and "other" objective portion226. The distance portion 222 enables the user to specify a distance proximity to the current location of the client device. For example, upon selection of the distance portion 222 and specifying the proximity, the host may identify and present to the user one or more results that are responsive to the search query and are within the user-defined distance proximity. Similarly, the time portion 223 enables the user to specify a time proximity to the current location of the client device. For example, upon selection of the time proximity 223 and specifying the proximity, the host identifies and displays to the user one or more results that are within the user-specified time proximity to the current location of the client device. Because the current location may change as the user travels, some of the results may no longer be responsive to the specified proximity. Thus, the remove portion 224 allows the user to instruct the host to remove the results that are no longer within the user-defined proximity of the current location of the client device changes.

For example, if the user instructs the host to identify a result located within 2 miles of the current location, the host may identify and present a result located within 2 miles of the current location of the client device. If the client device moves, results no longer within the 2 miles proximity may be removed from a result list presented to the user. Similarly, the new results that were previously outside of the 2 miles proximity and are now within the 2 miles proximity may be added to the result list presented to the user.

The "other" objective portion 226 enables the user to specify alternative or additional objectives for use in identifying the result. In one example, the alternative or the additional objective may include taking into consideration traffic conditions when determining a result within a user-specified time from the current location of the client device.

The user interface 200 also includes the result selection portion 230. The result selection portion 230 enables the user to select one or more result categories. As shown, the result categories include restaurants, hotels, real estates, shopping centers, movie theaters, food markets, and "other" categories. The result categories may have associated sub-categories, such that when the user selects one of the result categories, the user is enabled to specify one or more criteria for use in identifying the result. In one example, if the user is searching for a particular hotel, the user may select the hotel category from the result selection portion 230. Upon selecting the hotel category, the user may be presented with another user interface enabling the user to specify one or more criteria associate with the hotel category. The criteria may include a price under $50, as described in more detail with respect to FIG. 3. If the user is searching for a particular service or location that is not shown, the user may specify the result in an "other" category field 232.

The user may activate the search selection portion 240 after specifying parameters in the user interface 200. In response to receiving the search query, the host identifies a result. The host may then enable the user to access the result.

FIG. 3 illustrates an exemplary topological configuration 300 with a user traveling on route 295 from Washington D.C. to Baltimore and searching for a hotel that costs under $50 per night and that is located within 1 mile from the current location of the client device. In one example, the client device includes a vehicle that includes a navigation system. In another example, the client device may include a mobile device such as a cellular phone, which may include a navigation application.

The user starts the user's trip at location A and provides the host with a search query. In one example, using the navigation system operated in the vehicle, the user accesses an exemplary UI, such as the UI 200 to specify and submit the search query to the host. The search query includes the point of interest and the current location of the client device. The point of interest includes a hotel, offering a room for under $50 per night. The current location (e.g., the location A) corresponds to the actual position of the client device and may be entered either manually by the user or automatically by one or more location-based systems, such as, for example, a GPS system.

In response to receiving the search query, the host accesses user-defined information that relates to a travel proximity, and the host determines the travel proximity based on the accessed user-defined information. In keeping with the previous example, the travel proximity includes a travel distance of 1 mile from the current location of the client device. The user-defined information may be part of a travel objective that also may be received at the host with the search query. In particular and referring to the UI 200, the search query includes the travel objective portions, allowing the user to define the travel objective. The travel objective includes instructions for identifying how far a potential location for hotel should be from the current location of the client device.

For example, as shown in FIG. 3, configuration 300 may specify the result should be within 1 mile of the current location.

In response to receiving the user selection(s), the host references the travel objective to identify a hotel location that is within 1 mile from the current location of the client device and offers a room for under $50 per night. In particular, the host applies the travel objective to the current location to identify a search boundary that includes a circular shape, which the host would in turn use to search for a hotel offering a room for under $50 per night. In one example, the circular boundary is centered at the current location of the client device and includes a radius of 1 mile.

To illustrates and referring to FIG. 3, when the client device is at location A, the host generates a circular boundary 301 and searches within the circular boundary 301 for a potential location associated with the point of interest. The circular boundary is centered at the current location of the client device (e.g., location A) and includes a radius of 1 mile. After conducting the search, the host determines that there are no hotels, offering a room for under $50 per night, within 1 mile of the client device's current location (e.g., location A).

As the user travels from location A to location B, the host waits to receive a new location of the client device. In one implementation, the update indicator 214 in the UI 200, allows the user to automatically provide the host with the new location of the client device as the location of the client device changes. For example, the location of the client device may be periodically submitted to the host irrespective of whether the location of the client device has actually changed. Alternatively, the location of the client device may be updated when the location actually changes. For instance, if the current location of the client device changes, the client device detects the change and submits the new location of the client device to the host. In either case, the host receives the new location (e.g., location B) and determines whether the new location differ by more than a threshold amount from the previous location received with the search query (e.g., location A). The threshold may be defined by the user and/or the host.

Upon determination that the new location (e.g. location B) differs by more than the threshold amount from the previous location A, the host generates a circular search boundary 302. The circular search boundary 302 is centered at the new location (e.g., location B) and includes a radius of 1 mile. The host uses the circular search boundary 302 to search for a hotel, offering a room for under $50 per night. As a result of the search, the host identifies, within the circular search boundary 302, a first hotel (e.g., hotel 1) that includes a room for under $50 per night, and the host presents the search result to the user.

As the user travels from location B to location C, the client device continues to provide the host with the new location of the client device. The host receives the new location of the client device and checks to determine whether the new location differ by more than the threshold amount from the previously submitted location B. When the client device is at the new location C, the host determines that the new location does differ by more than the threshold amount from the previously submitted location (e.g., location B). Upon such determination, the host generates a circular search boundary 303, and the host searches within the circular search boundary 303 to identify a potential location for the hotel. The circular search boundary 303 is centered at location C and similar to the circular search boundaries 301 and 302 includes a radius of 1 mile. As a result of searching within the boundary 303, the host identifies a second hotel, offering a room for under $50 per night, and located within 1 mile of the current location of the client device.

The host updates the search result to include the second hotel location. In one implementation, as a part of the updating the search result, the host only displays results that are within the user-defined proximity from the current location of the client device. As such, as the previously identified result (e.g., the first hotel) move outside of the travel distance (e.g., the 1 mile radius) from the current location of the client device, the host deletes the search result from the search folder and/or the search list.

Based on a processing delay associated with identifying a result responsive to the search query and also based on the user's travel speed, by the time the identified result is presented to the user, the user may no longer be within the proximity of the identified result. To remedy this concern, in one implementation, the host is configured to identify a future location of the client device within a certain amount of time and identifies a result within the proximity of the future location. As such, by the time the result is presented to the user, the user is likely to be at the future location and the result will be within the proximity of the user. This implementation is described in more detail below with respect to FIG. 4.

Figure 4:
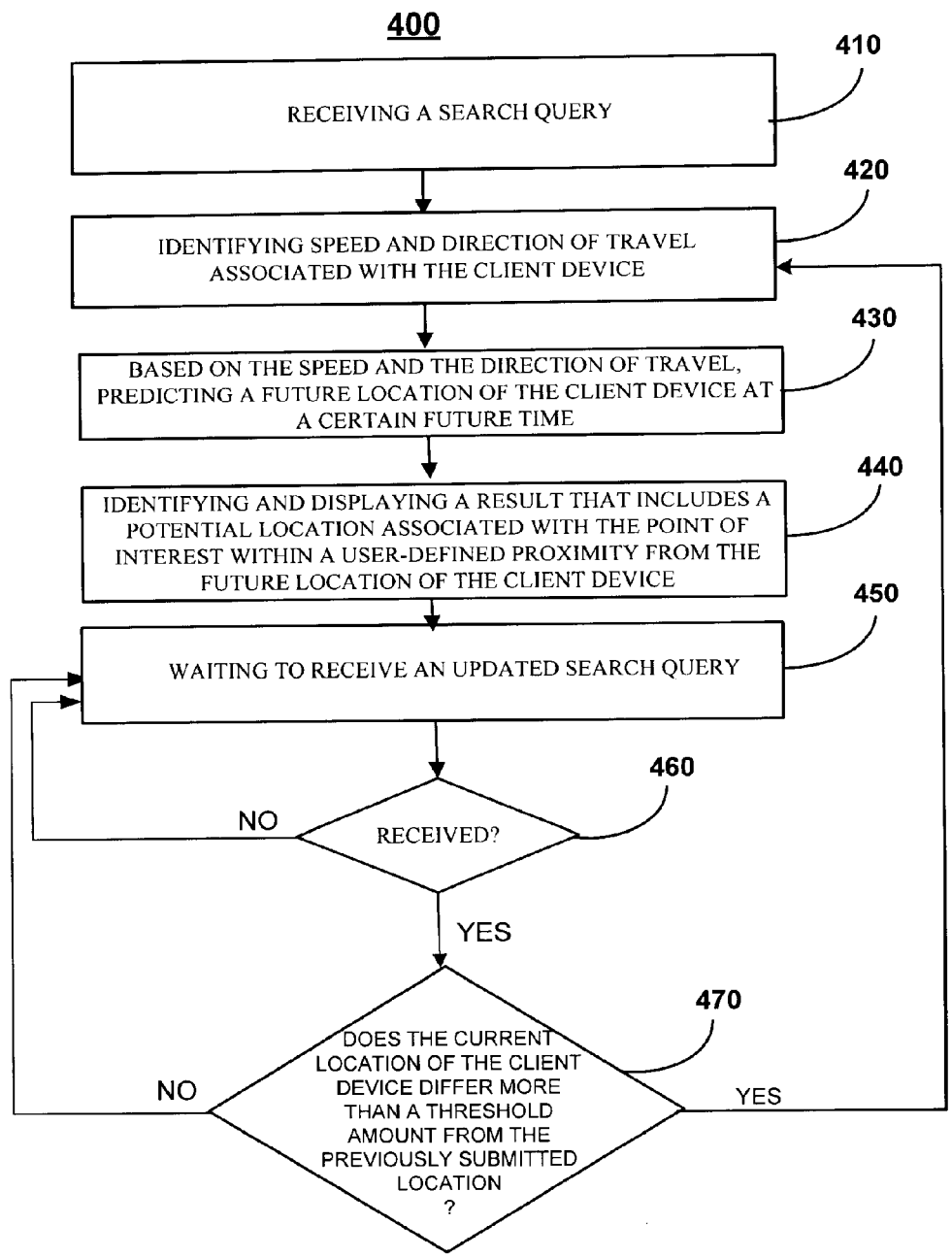
FIG. 4 illustrates another exemplary process used by a hosted service to identify a result within a user-defined proximity from a current location of a client device operated by the user.

FIG. 4 illustrates an exemplary process 400 used by hosted service to identify to identify a result within a user-defined proximity from the future location of the client device. Process 400 begins with the host receiving a search query (410). The search query may be submitted via the UI 200 of FIG. 2, for example, and the search query may include the current location of the client device, a point of interest, and a travel objective. The travel objective may include instructions for identifying a potential location associated with the point of interest, such that the potential location is within a certain amount of time and/or distance from the current location of the client device.

The host also identifies the speed and the direction of travel associated with the client device (420). To this end and in one implementation, the client device may be equipped with a navigation system that submits to the host the speed and direction of travel associated with the client device. For example, the navigation system may have previously received from the user of the client device the addresses associated with the starting location and the ending location and may have mapped the direction of travel for the user. In another implementation, the client device continuously submits location data to the host and the host uses the location data to derive and/or anticipate the direction of travel. In one specific example, the location data may include radio frequency signals transmitted from a mobile device (e.g., a cellular phone). In particular, the mobile device transmits radio frequency signals, which are received at the host. The received radio frequency signals may include different patterns as they bounce around different infrastructures before reaching the host. The host identifies the frequency patterns and matches and/or associates those patterns with previously stored frequency pattern having a particular location associated therewith. In this manner, the host derives the current location of the traveling mobile device. The host may then reference a map to determine the road associated with the current location and thus identifying the direction of travel.

Based on the speed and direction of travel, the host predicts a future location of the client device at a certain future time (430). For instance, the host may predict the future location of the client device in 5 minutes from the present time. To do so, the host may first identify a travel distance ("X") by multiplying the velocity ("V") of the client device with the time ("T") as shown in equation 1 and then may add the travel distance to the current position of the client device to identify a future location of the client device as shown in equation 2.

$$X = V*T \quad \text{(Equation 1)}$$

$$X_{future} = X_{present} + X \quad \text{(Equation 2)}$$

Upon predicting the future location, the host identifies and displays a result that includes a potential location associated with the point of interest within a user-defined proximity from the future location of the client device (440). To do so, the host may perform the same actions performed in operational block (130) of process 100. The host then waits to receive an updated search query (450) and uses the operational block (460) to determine whether the search query has been updated. If not, the host continues actions within the operational blocks (450 and 460) until the host receives an updated search query or otherwise instructions from the user to halt the process. If the host does receive an updated search query, then the host determines whether the current location of the client device differ by more than a threshold amount from the previously submitted location (470). If so, the host continues actions (420, 430, 440, and 450) until a desired result is found or the host is instructed to halt the process.

In a slightly modified scenario, in addition to identifying the future location of the client device, the host may also determine one or more intermediary locations between the future location and the current location of the client device. The host may then form a boundary that includes these location and search for a potential location associated with the point of interest within the identified boundary. In one example, the boundary may include an elliptical shape.

Other implementations are within the scope of the following claims. For example, a user interface may be configured to enable the user to automatically provide and update the current location of the client device to the host without requiring a user to select options in a current location selection portion. The user also may override an "automatic mode determination" and provide the current location of the client device manually or via, for example, selecting the options in the current location selection portion 110.

In another example, a user interface may be configured to accept a time and date during which the search should be performed. In particular, the user interface may include a time and date field to enable the user to specify a particular time and date on which the search should be performed. To keep with a previous example, a business traveler who frequently travels during weekdays may specify a search for a hotel to be performed Monday through Friday between 6 to 8 pm. In this manner, the traveler only needs to specify these parameters once and thereon, the host automatically searches for a desired hotel on the specified day and time. In addition, in this manner the system may be configured to search for different points of interest depending on a particular time of day.

The host may be configured to add additional results to the result list if new results that are responsive to the search query and the travel objective are identified. However, the host may be configured to preserve previously identified results (in one instance). More particularly, the host may be configured to preserve the results that were previously within the user-defined proximity of the current location of the client device, but, due to a change in the current location, are no longer within that proximity.

In another implementation, the host may be configured to prioritize the results. For example, the results may be sequentially presented in the result list in order of their proximity to the current location of the client device. The result that is closest in time or distance from the current location may be presented first, and the result that is furthest in time or distance from the current location may be presented last. If the results are presented in the map, the results may be prioritized as the results are presented. For example, the result that is closest in time or distance from the current location may be "highlighted" and the result that is furthest in time or distance from the current location may be "faded."

In another implementation, as the current location of the client device changes, the result identified by the host may be updated. As part of updating the results, the information regarding the travel time or the travel distance to the result location also may be updated to be responsive to the current location of the client device.

In another implementation, the travel objective may be identified by the host. For example, the host may identify a result that is within a host-identified proximity (e.g., time or distance) of the current location of the client device. The host may use the frequency at which the current location changes to determine how fast the user is traveling. Based on the speed of the traveling user, the host may identify a result. For example, the host may determine the user is walking if the user is traveling 1 mile per hour; therefore, the host may identify results that are within walking distance to the user. In another example, the host may determine the user is driving if the user is traveling 70 miles per hour; therefore, the host may identify results that are within driving distance to the user. In another implementation, the user may be enabled to specify one or more travel objectives as default objectives so that, in a subsequent attempt to identify a particular service or location, the user may not need to provide the host with the travel objective.

In another implementation, the user may be searching for a particular service or location that is moving. The particular service may be a mobile ice cream truck. To identify if the ice cream truck is within a user-defined proximity of the current location of the client device, the host determines the current location of the ice cream truck. The host may determine the current location of the ice cream truck via GPS, global IP address, wireless network correlation techniques, and/or "other" techniques, such as TV tower, cell tower, and/or radio frequency signal patterns to derive location.

Other implementations are within the scope of the following claims.

What is claimed is:

1. A method for identifying a result responsive to a current location of a client device, the method comprising:
   receiving, from a client device and at a host, a search query that includes a point of interest and a location corresponding to a current location of the client device;
   accessing user-defined information that relates to a travel distance or travel time;
   determining the travel distance or the travel time based on the accessed user-defined information;
   referencing a first travel objective that includes instructions for processing the location corresponding to the current location of the client device received with the search query, the travel distance or the travel time determined based on the accessed user-defined information, and the point of interest received with the search query to identify at least one potential location based on a relationship between the potential location and the point of interest and based on a determination that the potential location and the location of the client device received with the search query are located within the travel distance or accessible within the travel time determined based on the accessed user-defined information;

identifying a search result by applying the first travel objective to the location corresponding to the current location of the client device;

automatically receiving, from the client device, a new location of the client device as the location of the client device changes;

determining a local time for the client device;

identifying a predicted route for the client device based on the current location and the new location;

referencing, from a memory system on the host, a service travel objective indicating that a user is interested in a specific service representing a certain category of a service during a particular time that begins at a first time and concludes at a second time, the service travel objective not being submitted as part of the search query and also reflecting an inferred interest of the user that is based on modeled behavior not specified by the user in settings on the client device;

determining, based on referencing the service travel objective and using the predicted route and the local time, that the user will be interested in the specific service representing the certain category of service during the particular time that begins at the first time and concludes at the second time;

updating the search result to include at least one potential location that provides the certain category of service; and enabling the client device to automatically access and display, based on identifying a predicted route and based on the inferred determination of interest in the certain category services at the particular time, the search result independent of whether the user has expressed interest in the specific service at the particular time, wherein the search result that is displayed is updated to reflect changes to the inferred determination interest that varies over time and with respect to the current location and the predicted route;

wherein the accessing the user-defined information includes accessing the user-defined information that relates to the travel distance; and updating the search result includes at least one potential location located within the travel distance from the new location of the client device if the new location of the client device differs by more than a threshold amount from the location received with the search query.

2. The method of claim 1 wherein the location corresponding to the current location of the client device includes an actual position of the client device.

3. The method of claim 1 wherein the location corresponding to the current location of the client device includes a location that is used as a surrogate for the current location of the client device.

4. The method of claim 3 wherein the location used as the surrogate includes a location of a base station or an access point that the client device uses for communication, the location of the base station or the access point indicating a proximate current location of the client device.

5. The method of claim 4 wherein the base station includes a cellular base station and the client device includes a mobile phone.

6. The method of claim 1 wherein automatically receiving the new location of the client device includes automatically receiving, from the client device, the new location as a part of an updated search query as the location of the client device changes.

7. The method of claim 1 wherein automatically receiving the new location of the client device further includes periodically receiving, from the client device, location information associated with the client device irrespective of whether the current location of the client device has changed.

8. The method of claim 1 wherein automatically receiving the new location includes receiving, from the client device and without an input from a user of the client device, the new location of the client device if it is determined that the new location is different from the previous location of the client device received with the search query.

9. The method of claim 8 wherein the new location is determined via a location-based system.

10. The method of claim 9 wherein the location-based system includes a global positioning system.

11. The method of claim 1 wherein updating the search result includes:

referencing the first travel objective that includes instructions for processing the new location of the client device, the travel distance or the travel time determined based on the accessed user-defined information, and the point of interest received with the search query to identify at least one potential location based on a relationship between the potential location and the point of interest and based on a determination that the potential location and the new location of the client device are located within the travel distance or accessible within the travel time determined based on the accessed user-defined information; and updating the search result by applying the first travel objective to the new location of the client device.

12. The method of claim 11 wherein updating the search result includes replacing the search result with a new search result including the at least one potential location that is associated with the point of interest and that is located within the travel distance or accessible within the travel time from the new location of the client device.

13. The method of claim 11 wherein updating the search result includes appending the search result with a new search result including the at least one potential location that is associated with the point of interest and that is located within the travel distance or accessible within the travel time from the new location of the client device.

14. The method of claim 11 wherein the at least one potential location is associated with the point of interest received with the search query, and the at least one potential location is located within the travel distance or accessible within the travel time, determined based on the accessed user-defined information, from the new location of the client device.

15. The method of claim 1 wherein the search query includes a user entered keywords and detected location corresponding to the current location of the client device.

16. The method of claim 1 wherein the search query includes a user entered keywords and a user entered location corresponding to the current location of the client device.

17. The method of claim 1 wherein the point of interest includes an establishment associated with one or more locations.

18. The method of claim 1 wherein the point of interest includes a facility name.

19. The method of claim 1 wherein the point of interest includes an object in which a user of the client device is interested.

20. The method of claim 19 wherein the object is associated with a particular activity.

21. The method of claim 1 wherein updating the search result includes deleting the search result that falls outside the determined travel distance or travel time from the new location of the client device.

22. The method of claim 1 wherein:
accessing the user-defined information includes accessing the user-defined information that relates to the travel time; and
updating the search result includes updating the search result to include at least one potential location located within the travel distance from the new location of the client device if it is determined the new location of the client device differs by more than the threshold amount from the location received with the search query.

23. The method of claim 1 further comprising receiving an indication of time at which the search result should be identified.

24. A method for identifying a result responsive to a current location of a client device, the method comprising:
receiving, from a client device and at a host, a search query that includes a point of interest and a location corresponding to the current location of the client device;
accessing user-defined information that relates to a travel distance or travel time;
determining the travel distance or the travel time based on the accessed user-defined information;
referencing a first travel objective that includes instructions for processing the location corresponding to the current location of the client device received with the search query, the travel distance or the travel time determined based on the accessed user-defined information, and the point of interest received with the search query to identify at least one potential location based on a relationship between the potential location and the point of interest and based on a determination that the potential location and the location of the client device received with the search query are located within the travel distance or accessible within the travel time determined based on the accessed user-defined information;
identifying a search result by applying the first travel objective to the location corresponding to the current location of the client device;
automatically receiving, from the client device, a new location of the client device as the location of the client device changes;
determining a local time for the client device;
identifying a predicted route for the client device based on the current location and the new location;
referencing, from a memory system on the host, a service travel objective indicating that a user is interested in a specific service representing a certain category of a service during a particular time that begins at a first time and concludes at a second time, the service travel objective not being submitted as part of the search query and also reflecting an inferred interest of the user that is based on modeled behavior not specified by the user in settings on the client device;
determining, based on referencing the service travel objective and using the predicted route and the local time, that the user will be interested in the specific service representing the certain category of service during the particular time that begins at the first time and concludes at the second time;
updating the search result to include at least one potential location that provides the certain category of service; and
enabling the client device to automatically access and display, based on identifying a predicted route and based on the inferred determination of interest in the certain category services at the particular time, the search result independent of whether the user has expressed interest in the specific service at the particular time, wherein the search result that is displayed is updated to reflect changes to the inferred determination interest that varies over time and with respect to the current location and the predicted route,
wherein updating the search result includes:
referencing the first travel objective that includes instructions for processing the new location of the client device, the travel distance or the travel time determined based on the accessed user-defined information, and the point of interest received with the search query to identify at least one potential location based on a relationship between the potential location and the point of interest and based on a determination that the potential location and the new location of the client device are located within the travel distance or accessible within the travel time determined based on the accessed user-defined information,
updating the search result by applying the first travel objective to the new location of the client device, and
replacing the search result with a new search result including the at least one potential location that is associated with the point of interest and that is located within the travel distance or accessible within the travel time from the new location of the client device;
wherein the accessing the user-defined information includes accessing the user-defined information that relates to the travel distance; and
updating the search result includes at least one potential location located within the travel distance from the new location of the client device if the new location of the client device differs by more than a threshold amount from the location received with the search query.

25. The method of claim 24 wherein the location corresponding to the current location of the client device includes an actual position of the client device.

26. The method of claim 24 wherein the location corresponding to the current location of the client device includes a location that is used as a surrogate for the current location of the client device.

27. The method of claim 26 wherein the location used as the surrogate includes a location of a base station or an access point that the client device uses for communication, the location of the base station or the access point indicating a proximate current location of the client device.

28. The method of claim 24, wherein base station includes a cellular base station and the client device includes a mobile phone.

29. The method of claim 24 wherein automatically receiving the new location of the client device includes automatically receiving, from the client device, the new location as a part of an updated search query as the location of the client device changes.

30. The method of claim 24 wherein automatically receiving the new location of the client device further includes periodically receiving, from the client device, location information associated with the client device irrespective of whether the current location of the client device has changed.

31. The method of claim 24 wherein automatically receiving the new location includes receiving, from the client device and without an input from a user of the client device, the new location of the client device if it is determined that the new location is different from the previous location of the client device received with the search query.

32. The method of claim 31 wherein the new location is determined via a location-based system.

33. The method of claim 31 wherein the location-based system includes a global positioning system.

34. The method of claim 24 wherein the search query includes a user entered keywords and detected location corresponding to the current location of the client device.

35. The method of claim 24 wherein the search query includes a user entered keywords and a user entered location corresponding to the current location of the client device.

36. The method of claim 24 wherein the point of interest includes an establishment associated with one or more locations.

37. The method of claim 24 wherein updating the search result includes deleting the search result that falls outside the determined travel distance or travel time from the new location of the client device.

38. The method of claim 24 further comprising receiving an indication of time at which the search result should be identified.

* * * * *